United States Patent [19]
Bushman

[11] Patent Number: 5,497,156
[45] Date of Patent: Mar. 5, 1996

[54] TOWED TARGET

[75] Inventor: Boyd B. Bushman, Lewisville, Tex.

[73] Assignee: Lockheed Corporation, Ft. Worth, Tex.

[21] Appl. No.: 228,306

[22] Filed: Apr. 15, 1994

[51] Int. Cl.[6] .............................. H01Q 15/14; B64D 3/00
[52] U.S. Cl. .................. 342/9; 244/2 TD; 89/1.11
[58] Field of Search ....................... 89/1.11; 244/1 TD,
                                              244/136; 342/9

[56] References Cited

U.S. PATENT DOCUMENTS

| | | | |
|---|---|---|---|
| 2,751,167 | 6/1956 | Hooper et al. | 244/1 TD |
| 2,823,376 | 2/1958 | Baldwin et al. | 342/9 |
| 2,869,120 | 1/1959 | Lolmaugh et al. . | |
| 2,898,588 | 8/1959 | Graham | 342/9 |
| 3,121,227 | 2/1964 | Franklin | 342/9 |
| 3,761,929 | 9/1973 | Wyatt . | |
| 3,878,524 | 4/1975 | Olstowski . | |
| 3,976,008 | 8/1976 | Altschuler et al. . | |
| 4,233,605 | 11/1980 | Coleman . | |
| 4,286,498 | 9/1981 | Block et al. . | |
| 4,327,364 | 4/1982 | Moore . | |
| 4,718,320 | 1/1988 | Brum | 89/1.11 |
| 4,756,778 | 7/1988 | Deitz et al. . | |
| 4,852,455 | 8/1989 | Brum | 244/1 TD |
| 5,092,244 | 3/1992 | Giglia . | |
| 5,224,663 | 7/1993 | Criswell | 244/1 TD |
| 5,260,820 | 11/1993 | Bull et al. | 342/9 |
| 5,333,814 | 8/1994 | Wallis | 244/1 TD |

Primary Examiner—Charles T. Jordan
Assistant Examiner—Theresa M. Wesson
Attorney, Agent, or Firm—James E. Bradley

[57] ABSTRACT

A towed target or decoy serves to avoid heat-seeking and radar missile attacks on a jet aircraft. The decoy has a body with a nose and a sidewall. A ring surrounds the body and the spaced from it. The interior of the ring and the exterior of the body have reflective surfaces. The reflective surfaces reflect heat energy from the exhaust in various directions. This creates a greater heat signal than from the aircraft itself, attracting heat-seeking missiles. The decoys nest within one another and are deployed from an ejection housing mounted to the aircraft.

33 Claims, 4 Drawing Sheets

TOWED TARGET

BACKGROUND OF THE INVENTION

1. Field of the Invention

This invention relates in general to techniques for avoiding both heat-seeking and radar missiles in a military aircraft, and particularly to a decoy towed behind the aircraft to attract the missile away from the aircraft.

2. Description of the Prior Art

Military aircraft are vulnerable to attacks from missiles. Extensive measures are available for evading radar detection. These measures include special coatings on the aircraft's skin, special shapes to the airframe, and electronic countermeasures. Also, metallic chaff can be ejected to create a false radar signal.

Heat-seeking missiles, on the other hand, are not confused by these radar countermeasures. A heat-seeking missile hones in on infrared radiation emitted from the exhaust plume of the jet engine. A jet fighter airplane may be able to evade a heat-seeking missile if provided with adequate warning, mainly by making extreme flight maneuvers. If the pilot or the radar detection system of the aircraft fails to detect a heat-seeking missile, a strike is likely. One proposed technique to counter heat seeking missiles would be to deploy a flare which burns or creates hot metal vapors. The flare might draw away the missile. However, the aircraft will quickly be out of range of the flare, and therefore, would soon be vulnerable again to another strike. Consequently, the proposals concerning pyrotechnic flares and chaff require detection of the heat-seeking missile before the chaff is deployed.

Targets have been towed behind the aircraft for practice firing of ground weapons. Also, U.S. Pat. No. 4,233,605 discloses towing a helicopter radar decoy behind the helicopter. The decoy has a radar cross-section that simulates helicopter blades. The decoy reflects a stronger radar signal than the actual helicopter, leading hostile weapons to the decoy. This decoy, however, has no effect on infrared-guided missiles.

SUMMARY OF THE INVENTION

In this invention, a plurality of targets or decoys are deployed in an ejection housing on the aircraft. Each of the decoys has a body with a nose and a generally conical sidewall which is reflective. Each of the decoys also has an annular member or ring extending around and spaced from the body. The interior of the ring is generally conical also but decreases in diameter in a rearward direction.

When in hostile territory, the decoy will be deployed from the ejection housing on a line prior to detecting any missiles. Light or infrared radiation emitted from the exhaust plume and hot metal reflects on the decoy body and also on the interior conical surfaces of the ring, causing reflections to the rear and also forward of the decoy. A heat-seeking missile would detect a much stronger signal from the decoy than from the exhaust plume. The decoy thus lures the heat-seeking missile to it, preventing a strike on the aircraft. Radar missiles will also see a radar return from the decoy and will be attracted toward it. The radar reduction is slightly less than the aircraft but will be encountered first by the radar missile since its terminal trajectory causes it to approach the aircraft from the rear aspect.

If a decoy is destroyed by missile, a sensor at the ejection housing will sense the absence due to the diminishing drag. A retainer within the ejection housing then advances another decoy to the rear. The other decoy will be deployed on a reel, and a sensor will monitor the tension.

DETAILED DESCRIPTION OF INVENTION

Figure 1:
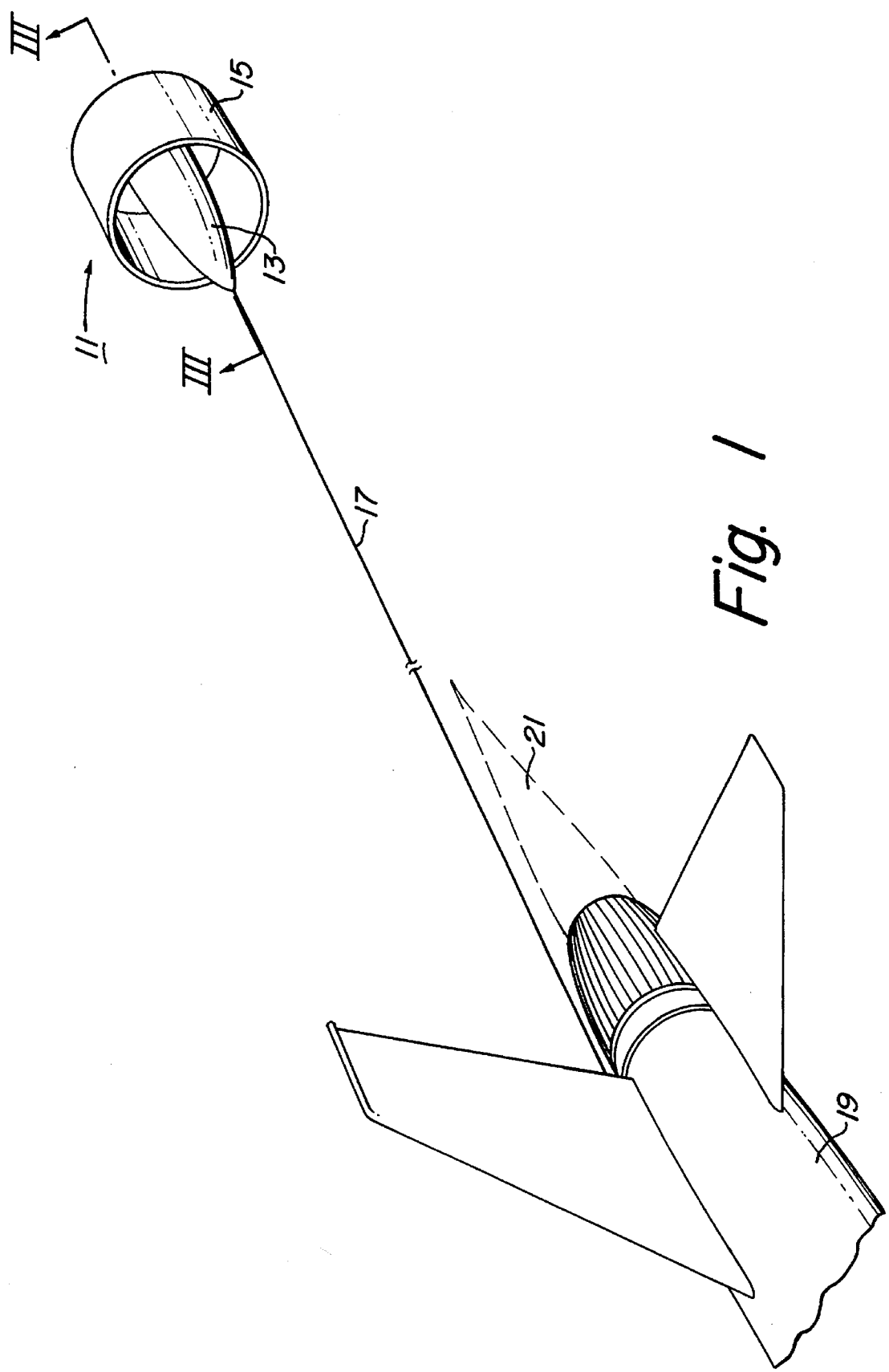
FIG. 1 is a perspective view of a decoy constructed in accordance with this invention being towed behind an aircraft.

Referring to FIG. 1, decoy 11 has a body 13 and a ring 15. Ring 15 is an annular member which concentrically encircles body 13 and is spaced radially outward from body 13. A line 17 connects decoy 11 to a military aircraft 19. Aircraft 19 is of a type that is operated by a jet engine and has an exhaust plume 21 which emits heat radiation, including infrared radiation.

Figure 3:
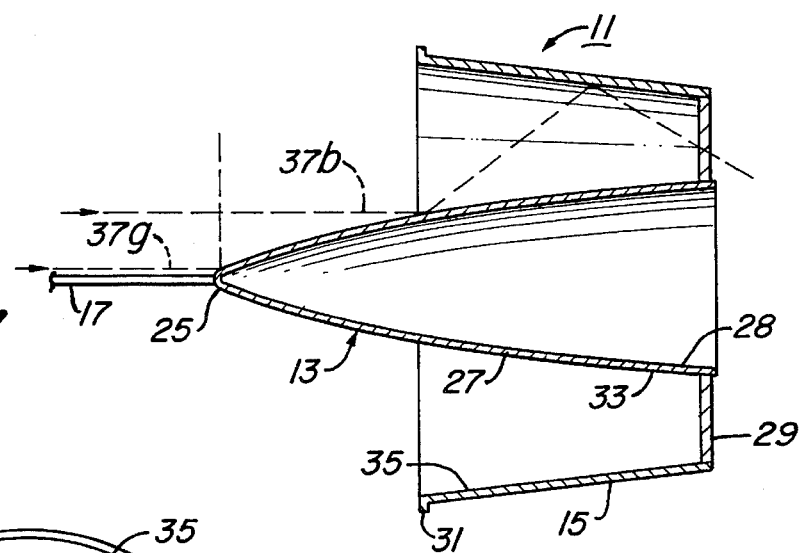
FIG. 3 is an enlarged cross-sectional view of the decoy of FIG. 1 taken along the line III—III of FIG. 1.

Referring to FIG. 3, body 13 has a generally conical or parabolic shape with a nose 25 on the forward end which forms an apex that is somewhat blunted. Nose 25 leads gradually into a sidewall 27 that is also conical, resulting in the rearward end of body 13 being larger in diameter than the portion that blends into nose 25. The curvature of the sidewall 27 is compound, as is nose 25. Sidewall 27 tapers rearward in a diverging taper. Body 13 is hollow and has an opening 28 at the rearward end. Line 17 attaches to nose 25.

Figure 4:
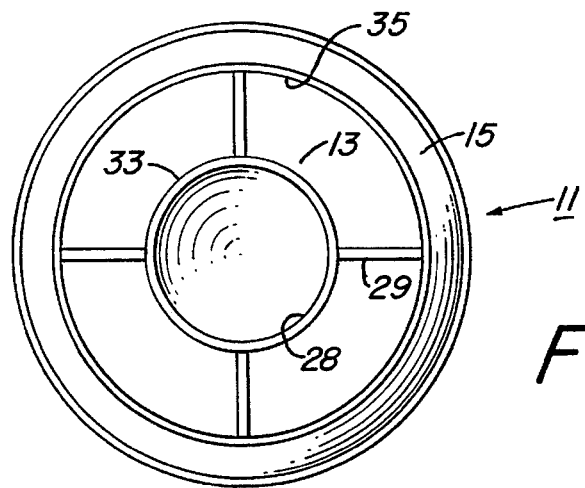
FIG. 4 is a rear elevational view of the decoy of FIG. 1.

Ring 15 is concentrically supported from body 13 by a plurality of radially extending spokes 29, as shown in FIG. 4. Spokes 29 join the rearward end of body 13, adjacent opening 28. In the preferred embodiment, ring 15 has a uniform thickness. Ring 15 is also conical, but it converges in a rearward direction, having a greater diameter on its forward end than on its rearward end. In the embodiment shown, ring 15 is a straight conical surface, rather than having a compound curvature as sidewall 27. A lip 31 protrudes outward from the forward rim of ring 15.

Nose 25 and sidewall 27 have a light reflective exterior 33, such as a polished aluminum surface, which highly reflects infrared radiation. Similarly, the interior surface 35 of ring 15 is highly reflective of infrared radiation. As a result, infrared radiation from exhaust plume 21 (FIG. 1) will reflect from the surfaces 33, 35. Some of the energy rays, such as energy ray 37a, will strike near the nose 25 and reflect generally laterally outward relative to the direction of flight of aircraft 19. Energy rays 37a may be observed by a heat-seeking missile approaching from the side or even forward of the aircraft 19. Other energy rays, indicated by the dotted lines 37b, will reflect back into the interior reflective surface 35. Because conical reflective surface 35 tapers oppositely from reflective surface 33, some of the energy rays 37*b* will reflect rearward. A heat-seeking missile approaching from the rear might detect reflections from the energy rays 37*b*. Energy rays 37*a*, 37*b* will reflect in 360 degree directions. Decoy 11 is also constructed so that it will have a radar cross-section or return greater than the radar cross-section of aircraft 19.

Figure 2:
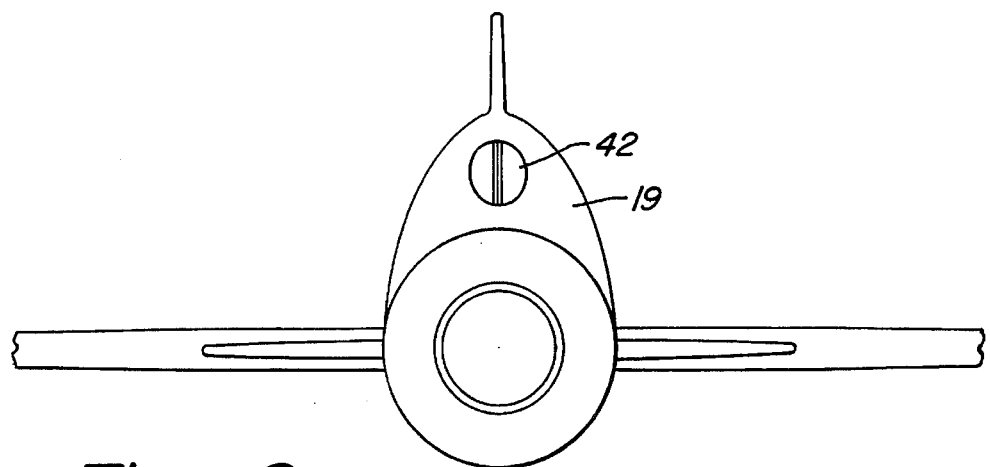
FIG. 2 is a rear view of the aircraft in FIG. 1, and showing the hatch doors closed to the ejection housing for the decoy in FIG. 1.
Figure 5:
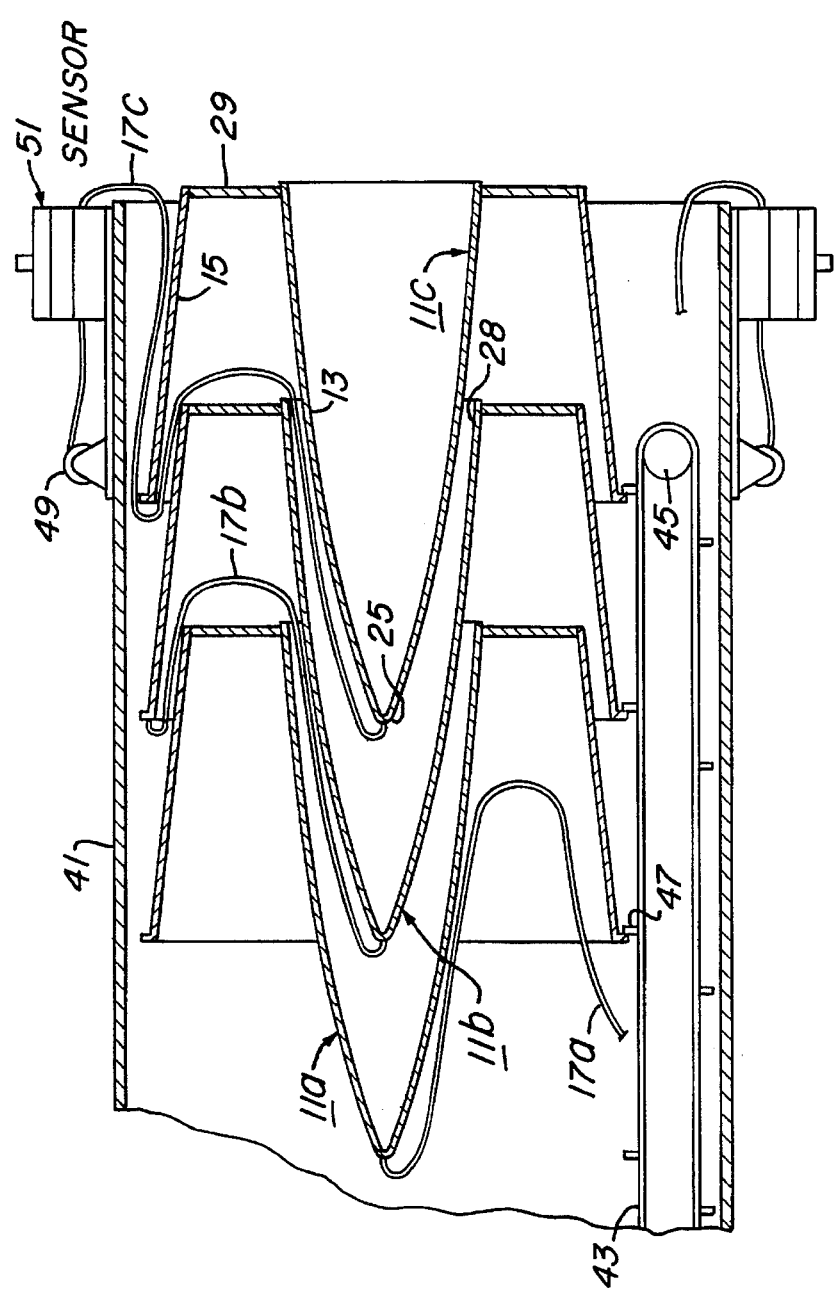
FIG. 5 is a vertical cross-sectional view of the ejection housing located within the aircraft of FIG. 1 and containing a number of the decoys constructed in accordance with this invention.
Figure 7:
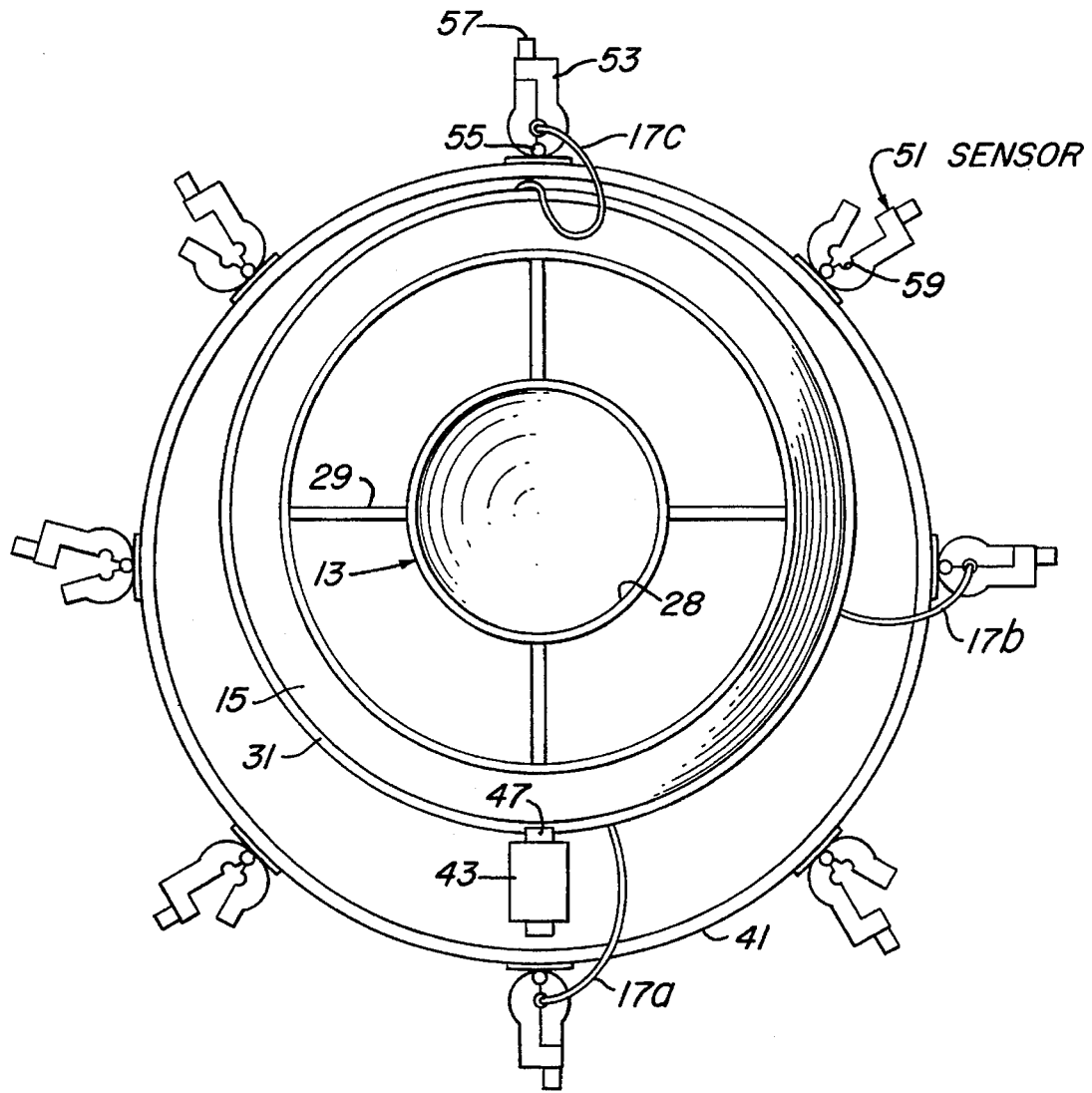
FIG. 7 is an end view of the ejection housing of FIG. 5, illustrating the reels for the various decoys.

Decoy 11 is deployed from an ejection housing 41 located within the fuselage of aircraft 19 at the rear. Hatch doors 42 to the ejection housing 41 are shown only in FIG. 2 and are shown closed. Preferably a number of decoys 11 will be carried in ejection housing 41 so that if one or more is struck by missiles, others can be deployed. FIG. 5 illustrates ejection housing 41 containing a number of decoys 11. By way of example, FIG. 7 shows that ejection housing 41 is capable of carrying eight decoys 11. As shown in FIGS. 5 and 7, five of the decoys 11 have already been deployed, leaving only three of the decoys 11, indicated by the numerals 11*a*, 11*b*, and 11*c*. Decoys 11*a*, 11*b*, and 11*c* are identical to each other. Decoys 11*a*, 11*b*, and 11*c* nest within one another while in ejection housing 41 and are deployed one at a time. The nose 25 of each decoy 11 passes through opening 28 and nests within the hollow body 13 of the next forward decoy 11. The ring 15 of each decoy 11 slides over and receives the ring 15 of the next forward decoy 11.

A retention belt 43 is used to eject one decoy 11 at a time. Retention belt 43 is a conveyor-type belt located in ejection housing 41 and extending parallel to the longitudinal axis of aircraft 19. Belt 43 extends in a loop around a driven roller 45, shown on the rearward end, and another roller (not shown) on the forward end, defining an upper span and a lower span. A plurality of spaced apart retaining members or lugs 47 protrude from belt 43. While on the upper span, each lug 47 will engage lip 31 on ring 15. If driven roller 45 rotates an increment rearward, lugs 47 will advance the nested decoys 11*a*, 11*b*, 11*c* rearward. As the most rearward lug 47 rotates around roller 45 and passes to the lower span, it frees the most rearward decoy 11*c* from any retention. If hatch doors 42 (FIG. 2) are open, a pressure difference due to the flying aircraft 19 will quickly suck out the most rearward decoy 11*c*.

Figure 6:
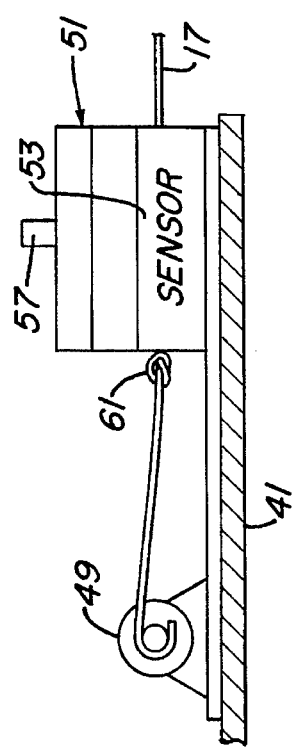
FIG. 6 is a side view of one of the sensors and reels for deploying one of the decoys in FIG. 5.

Each decoy 11*a*, 11*b*, 11*c* has a separate line 17*a*, 17*b*, 17*c*. Each line 17 is wrapped around a separate reel 49, as shown in FIG. 6. Reel 49 has an inertial speed brake to limit the speed at which the line 17 is pulled off as one of the decoys 11 is ejected. Once a decoy 11 is deployed, a sensor 51, shown in FIG. 6, senses the pull on line 17 using conventional techniques. Sensor 51 will detect if the tension has decreased greatly, which would occur if a missile has destroyed one of the decoys 11. Sensor 51 would then release the line 17, allowing it to completely unwind from reel 49 and eject to the atmosphere.

Sensor 51 is preferably constructed of two clamp halves 53, shown also in FIG. 7. The clamp halves 53 when in the closed position shown form a tubular shape. Clamp halves 53 are connected by a spring-biased hinge 55 that allows them to open and close. The spring of hinge 55 urges the clamp halves 53 to the open position. Five of the clamp halves 53 are shown open in FIG. 7. An electrical solenoid 57 incorporated with each sensor 51 locks the clamp halves 53 in the closed position. When closed, a passage 59 is defined by the clamp halves 53 for allowing the line 17 to pass through. As shown in FIG. 6, a protuberance or knot 61 in each line 17 has a diameter greater than passage 59. Protuberance 61 bumps against the clamp halves 53 when closed to retain the line 17 with the sensor 51.

In operation, when the aircraft 19 is in a vulnerable position, the first decoy 11 will be deployed. A vulnerable position would exist when aircraft 19 is flying low over hostile territory, such as to evade radar detection. Normally, the decoy 11 would be deployed before receiving any knowledge of any heat-seeking missile being fired toward aircraft 19. The deployment might be handled by the pilot but preferably is handled by the aircraft flight control system automatically. Normally, a decoy 11 would not be deployed if aircraft 19 is engaged in tight maneuvers, such as during a dogfight with an enemy aircraft.

When the signal to deploy is provided, the hatch doors 42 (FIG. 2) will open. Driven roller 45 (FIG. 5) will advance rearward one increment causing the most rearward lug 47 to release from lip 31 of the most rearward decoy 11*c*. The pressure difference will suck the most rearward decoy 11*c* out of the ejection housing 41. Reel 49 will limit the speed of travel of line 17*c* as it deploys out to avoid shock on line 17*c*. Line 17*c* would unwind from reel 49 until protuberance 61 (FIG. 6) contacts sensor 51.

Normally each line 17 would place one of the decoys 11 approximately 150 feet behind the aircraft 19. The shape of decoy 11 and the attachment point for line 17 are designed so that decoy 11 will be towed smoothly behind aircraft 19. The radar cross-section of decoy 11 is configured to be much larger than the radar cross-section of aircraft 19. Infrared radiation emitted from exhaust plume 21 will be reflected from the reflective surfaces 33, 35. The reflections will pass both forward, laterally outward and rearward in 360 degree directions. Decoy 11 thus mirrors the hot interior energy out of the aircraft 19 and out away from aircraft 19. To an infrared sensor, aircraft 19 will appear colder than its interior emission; therefore, decoy 11 will appear as a hot spark behind aircraft 19. If any heat-seeking missiles are fired toward aircraft 19, the missile will be attracted toward this hotter signal, leaving the aircraft 19 unharmed.

If a missile succeeds in destroying one of the decoys 11, sensor 51 will sense the absence of decoy 11 due to reduction in tension or force on line 17. Solenoid 57 will release clamp halves 53 to spring open, allowing protuberance 61 to pass through passage 59, completely releasing line 17 from reel 49. Then, driven roller 45 is signalled to advance belt 43 another increment rearward. Another lug 47 will move onto the lower span of belt 43, disengaging from lip 31. This would free up the next decoy 11 to be deployed on its line 17. The same procedures will apply to this decoy 11 as previously discussed.

The invention has significant advantages. The decoy will reduce the chance of being downed by heat-seeking missiles by drawing them away from the aircraft. The decoy, unlike pyrotechnic chaff, travels with the aircraft. If one of the decoys is destroyed, other decoys can be readily deployed. Detection of the approaching heat-seeking missile is not required. The decoy also serves to avoid hits due to radar-guided missiles because of the higher radar return signal provided by the configuration of the decoy.

While the invention has been shown in only one of its forms, it should be apparent to those skilled in the art that it is not so limited but is susceptible to various changes without departing from the scope of the invention.

I claim:

1. An apparatus for avoiding heat-seeking missile attacks on a jet aircraft which produces an exhaust plume which emits infrared radiation, comprising:

a decoy having a body with an exterior surface which has an infrared radiation reflective portion;

means for towing the body on a line behind the aircraft in a position for causing the infrared radiation reflective portion to receive and reflect infrared radiation emitted by the exhaust plume so as to attract heat-seeking missiles fired at the aircraft; and wherein the decoy comprises:

a nose section on a forward end of the body; and a sidewall section extending rearward from the nose section, wherein the infrared radiation reflective portion is located both on the nose section and the sidewall section.

2. An apparatus for avoiding heat-seeking missile attacks on a jet aircraft which produces an exhaust plume which emits infrared radiation, comprising:

a decoy having a body with an exterior surface which has an infrared radiation reflective portion;

means for towing the body on a line behind the aircraft in a position for causing the infrared radiation reflective portion to receive and reflect infrared radiation emitted by the exhaust plume so as to attract heat-seeking missiles fired at the aircraft; and wherein the decoy comprises:

a conical nose section on a forward end of the body, forming an apex; and a sidewall section extending rearward and conically tapering in a diverging taper from the nose section, wherein the infrared radiation reflective portion is located both on the nose section and the sidewall section.

3. The apparatus according to claim 1, further comprising:

an ejection housing adapted to be mounted to the aircraft; and retention means in the ejection housing for retaining the decoy within the ejection housing prior to deployment by the aircraft.

4. An apparatus for avoiding heat-seeking missile attacks on a jet aircraft which produces an exhaust plume which emits infrared radiation, comprising:

a decoy having a body with an exterior surface which has an infrared radiation reflective portion;

means for towing the body on a line behind the aircraft in a position for causing the infrared radiation reflective portion to receive and reflect infrared radiation emitted by the exhaust plume so as to attract heat-seeking missiles fired at the aircraft; and wherein:

a conical nose section is formed on a forward end of the body, forming an apex;

a sidewall section extends rearward from the nose section;

the infrared radiation reflective portion is located both on the nose section and the sidewall section; and wherein the decoy further comprises an annular member surrounding and spaced outward from the body, the annular member having an internal reflective surface means for receiving infrared radiation reflected by the sidewall section and for reflecting said infrared radiation in a rearward direction for attracting heat-seeking missiles approaching the aircraft from the rear.

5. An apparatus for avoiding heat-seeking missile attacks on a jet aircraft which produces an exhaust plume which emits infrared radiation, comprising:

a decoy having a body with an exterior surface which has an infrared radiation reflective portion;

means for towing the body on a line behind the aircraft in a position for causing the infrared radiation reflective portion to receive and reflect infrared radiation emitted by the exhaust plume so as to attract heat-seeking missiles fired at the aircraft; and wherein the decoy further comprises:

an annular member surrounding and spaced outward from the body, the annular member having an internal infrared radiation reflective surface means for receiving infrared radiation reflected by the body and for reflecting said infrared radiation received from the body in a rearward direction for attracting heat-seeking missiles approaching the aircraft from the rear.

6. An apparatus for avoiding heat-seeking missile attacks on a jet aircraft which produces an exhaust plume which emits infrared radiation, comprising:

a decoy having a body with an exterior surface which has an infrared radiation reflective portion;

means for towing the body on a line behind the aircraft in a position for causing the infrared radiation reflective portion to receive and reflect infrared radiation emitted by the exhaust plume so as to attract heat-seeking missiles fired at the aircraft; and wherein the decoy comprises:

a nose section on a forward end of the body; and a sidewall section extending rearward from the nose section, wherein the infrared radiation reflective portion is located both on the nose section and the sidewall section, and wherein the decoy further comprises an annular member surrounding, secured to and spaced from the sidewall section of the body, the annular member having an internal infrared radiation reflective surface, the internal radiation reflective surface of the annular member being conical and tapering to a smaller diameter in a rearward direction in a converging taper for reflecting infrared radiation from the sidewall section of the body in a rearward direction for attracting heat-seeking missiles approaching the aircraft from the rear.

7. An apparatus for avoiding heat-seeking missile attacks on a jet aircraft which produces an exhaust plume, comprising:

a decoy having a body with an exterior surface which has a reflective portion, the body adapted to be towed on a line behind the aircraft in a position for causing the reflective portion to reflect radiation emitted by the exhaust plume so as to attract heat-seeking missiles fired at the aircraft, wherein the decoy comprises a nose section on a forward end of the body, forming an apex; and a sidewall section extending rearward and tapering from the nose section in a diverging taper, wherein the reflective portion is located both on the nose section and the sidewall section, and wherein the decoy further comprises an annular member surrounding, secured to and spaced from the sidewall section of the body, the annular member having an internal reflective surface, the internal reflective surface of the annular member being conical and tapering to a smaller diameter in a rearward direction in a converging taper for reflecting radiation from the sidewall section of the body in a rearward direction for attracting heat-seeking missiles approaching the aircraft from the rear.

8. An apparatus for avoiding heat-seeking missile attacks on a jet aircraft which produces an exhaust plume, comprising:

a decoy having a body with an exterior surface which has a reflective portion, the body adapted to be towed on a line behind the aircraft in a position for causing the reflective portion to reflect radiation emitted by the exhaust plume so as to attract heat-seeking missiles fired at the aircraft, wherein a nose section is formed on a forward end of the body, forming an apex;

a sidewall section extends rearward and tapers in a diverging taper from the nose section;

the line is adapted to attach to nose section;

the reflective portion is located both on the nose section and the sidewall section; and an annular member surrounds and is spaced outward from the sidewall section of the body by a plurality of braces, the annular member having an internal reflective surface, the internal reflective surface of the annular member tapering in a converging taper in a rearward direction, for reflecting radiation from the sidewall section of the body in a rearward direction for attracting heat-seeking missiles approaching the aircraft from the rear.

9. An apparatus for avoiding heat-seeking missile attacks on a jet aircraft which produces an exhaust plume, comprising:

a decoy having a body with an exterior surface which has a reflective portion, the body adapted to be towed on a line behind the aircraft in a position for causing the reflective portion to reflect radiation emitted by the exhaust plume so as to attract heat-seeking missiles fired at the aircraft, wherein the apparatus further comprises an ejection housing adapted to be mounted to the aircraft;

retention means in the ejection housing for retaining the decoy within the ejection housing prior to deployment by the aircraft; and a reel adapted to be mounted to the aircraft, wherein the line is adapted to extend from the decoy and around the reel, the reel unwinding when the retention means releases the decoy and wherein the apparatus further comprises sensing means for sensing if the decoy is detached from the line due to being struck by a missile, and if so, for releasing the line from the reel.

10. An apparatus for avoiding heat-seeking missile attacks on a jet aircraft which produces an exhaust plume, comprising:

at least one decoy connected to at least one line for towing behind the jet aircraft, the decoy comprising a body having a nose section on a forward end, forming an apex, and a sidewall section extending rearward in a diverging taper from the nose section, the nose section and sidewall section having exterior surfaces which are reflective to reflect radiation emitted by the exhaust plume away from the aircraft so as to attract heat-seeking missiles fired at the aircraft; and an annular member surrounding, secured to and spaced from the sidewall section of the body, the annular member having an internal reflective surface, the internal reflective surface of the annular member tapering rearward in a converging taper for reflecting radiation from the sidewall section of the body in a rearward direction for attracting heat-seeking missiles approaching the aircraft from the rear.

11. The apparatus according to claim 10, further comprising:

an ejection housing adapted to be mounted to the aircraft; and retention means in the ejection housing for retaining the decoy within the ejection housing prior to deployment by the aircraft.

12. The apparatus according to claim 10, further comprising:

an ejection housing adapted to be mounted to the aircraft;

retention means in the ejection housing for retaining the decoy within the ejection housing prior to deployment by the aircraft; and a reel adapted to be mounted to the aircraft, wherein the line is adapted to extend from the decoy around the reel, the reel unwinding when the retention means releases the decoy, and wherein the apparatus further comprises sensing means for sensing if the decoy is detached from the line due to being struck by a missile, and if so, for releasing the line from the reel.

13. The apparatus according to claim 10, wherein said at least one decoy comprises a plurality of the decoys and wherein the apparatus further comprises:

retention means for retaining the decoys on the aircraft, and for ejecting one of the decoys from the aircraft at a time, wherein there are a plurality of the lines, each line extending from one of the decoys to the aircraft; and sensing means for sensing if the decoy being towed is detached from the line due to being struck by a missile, and if so, for causing another decoy to be ejected by the retention means.

14. An apparatus for avoiding heat-seeking missile attacks on a jet aircraft which produces an exhaust plume, comprising:

a plurality of decoys;

retention means adapted to be carried on the aircraft for retaining a plurality of the decoys on the aircraft and for ejecting one of the decoys from the aircraft at a time;

a plurality of lines, each of the lines extending from one of the decoys to the aircraft when the retention means releases one of the decoys to tow the decoy behind the aircraft;

each of the decoys having a body with a reflective exterior surface for reflecting radiation emitted by the exhaust plume to attract heat-seeking missiles to the decoy rather than to the aircraft; and sensing means for sensing if the decoy being towed is detached from the line due to being struck by a missile, and if so, for causing the retention means to eject another of the decoys.

15. The apparatus according to claim 14, further comprising:

a single ejection housing which contains the plurality of decoys, wherein the decoys nest within one another while in the ejection housing.

16. The apparatus according to claim 14, further comprising:

a single ejection housing which contains the plurality of decoys, wherein the decoys nest within one another in the ejection housing and wherein the retention means comprises at least one retaining member, which engages a most rearward one of the decoys to prevent ejection of the most rearward one of the decoys from the ejection housing due to a pressure difference between the interior of the ejection housing and ambient pressure while the aircraft is flying; and means for releasing the engagement of retaining member with the most rearward one of the decoys.

17. The apparatus according to claim 14, further comprising:

a single ejection housing which contains the plurality of decoys, wherein the decoys nest within one another in the ejection housing and wherein the retention means comprises
a plurality of retaining members, each of which engages one of the decoys to prevent ejection of the decoys from the ejection housing due to a pressure difference between the interior of the ejection housing and ambient pressure while the aircraft is flying; and indexing means for incrementally moving the retaining members and the decoys rearward in the ejection housing when one of the decoys is to be deployed and for releasing the engagement of one of the retaining members with a most rearward one of the decoys.

18. The apparatus according to claim 14, further comprising:

a single ejection housing which contains the plurality of decoys, wherein the decoys nest within one another in the ejection housing and wherein the retention means comprises
a plurality of retaining members, each of which engages one of the decoys to prevent ejection of the decoys from the ejection housing due to a pressure difference between the interior of the ejection housing and ambient pressure while the aircraft is flying; and a longitudinally extending belt supported by a roller at a rearward end, defining an upper and a lower span;

the retaining members being mounted to the belt, such that when the belt is advanced rearward, the retaining members and the decoys move rearward in the ejection housing and when one of the retaining members passes around the roller, a most rearward one of the decoys is released.

19. The apparatus according to claim 14, further comprising:

a single ejection housing which contains the plurality of decoys; and a plurality of reels mounted to the housing, each of the lines being wrapped around one of the reels, wherein the decoys nest within one another in the ejection housing, and wherein the retention means comprises:
at least one retaining member which engages a most rearward one of the decoys to prevent ejection of the most rearward one of the decoys from the ejection housing due to a pressure difference between the interior of the ejection housing and ambient pressure while the aircraft is flying; and means for releasing the engagement of retaining member with the most rearward one of the decoys.

20. The apparatus according to claim 14, further comprising:

a single ejection housing which contains the plurality of decoys; and a plurality of reels mounted to the housing, each of the lines being wrapped around one of the reels, wherein the sensing means comprises a plurality of clamps, each of which receives one of the lines from one of the reels, each of the clamps being movable to a closed position when its line is deployed to provide support for one of the decoys deployed behind the aircraft and movable to an open position to release the line if tension in the line indicates that the decoy is no longer on the end of the line, wherein the decoys nest within one another in the ejection housing, and wherein the retention means comprises:
at least one retaining member which engages a most rearward one of the decoys to prevent ejection of the most rearward one of the decoys from the ejection housing due to a pressure difference between the interior of the ejection housing and ambient pressure while the aircraft is flying; and means for releasing the engagement of retaining member with the most rearward one of the decoys.

21. The apparatus according to claim 14, further comprising:

a single ejection housing which contains the plurality of decoys; and a plurality of reels mounted to the housing, each of the lines being wrapped around one of the reels, wherein the sensing means comprises a plurality of clamps, each of which receives one of the lines from one of the reels, each of the clamps being movable to a closed position when its line is deployed to provide support for one of the decoys deployed behind the aircraft and movable to an open position to release the line if tension in the line indicates that the decoy is no longer on the end of the line, wherein the decoys nest within one another in the ejection housing, and wherein the retention means comprises
a plurality of retaining members, each of which engages one of the decoys to prevent ejection of the decoys from the ejection housing due to a pressure difference between the interior of the ejection housing and ambient pressure while the aircraft is flying; and indexing means for incrementally moving the retaining members and the decoys rearward in the housing when one of the decoys is to be deployed and for releasing the engagement of one of the retaining members with a most rearward one off the decoys.

22. The apparatus according to claim 14, wherein the decoy further comprises:

an annular member surrounding and spaced from the body, the annular member having an internal reflective surface for reflecting radiation from the body in a rearward direction for attracting heat-seeking missiles approaching the aircraft from the rear.

23. The apparatus according to claim 14 wherein the decoy comprises:

a nose section on a forward end of the body;

a sidewall section extending rearward from the nose section, wherein the reflective portion is located both on the nose section and the sidewall section; and an annular member surrounding, secured to and spaced from the sidewall section of the body, the annular member having an internal reflective surface for reflecting radiation from the sidewall section of the body in a rearward direction for attracting heat-seeking missiles approaching the aircraft from the rear.

24. The apparatus according to claim 14 wherein the decoy comprises:

a nose section on a forward end of the body, forming an apex;

a sidewall section extending rearward and conically tapering from the nose section, wherein the reflective portion is located both on the nose section and the sidewall section; and an annular member surrounding, secured to and spaced from the sidewall section of the body, the annular member having an internal reflective surface, the internal reflective surface of the annular section being conical and tapering to a smaller diameter in a rearward direction for reflecting radiation from the sidewall section of the body in a rearward direction for attracting heat-seeking missiles approaching the aircraft from the rear.

25. An apparatus for avoiding heat-seeking missile attacks on a jet aircraft which produces an exhaust plume, comprising:

a plurality of decoys, each of the decoys having a body with a nose and sidewall which has a diverging taper in a rearward direction, the nose and sidewall each having a reflective exterior surface and each of the decoys having an annular member supported to, spaced from and extending around the body, the annular member having an interior surface which has a converging taper in a rearward direction and which has a reflective surface;

an ejection housing adapted to be mounted to the aircraft;

retention means for retaining a plurality of the decoys nested within one another in the ejection housing and for ejecting one of the decoys from the ejection housing at a time;

a plurality of lines, each of the lines extending from one of the decoys to the aircraft when the retention means releases one of the decoys to tow the decoy behind the aircraft, the reflective surfaces reflecting radiation emitted by the exhaust plume to attract heat-seeking missiles to the decoy rather than to the aircraft; and sensing means for sensing if the decoy being towed is detached from the line due to being struck by a missile, and if so, for causing the retention means to eject another of the decoys.

26. The apparatus according to claim 25, wherein the retention means comprises:

at least one retaining member, which engages a most rearward one of the decoys to prevent ejection of the most rearward one of the decoys from the ejection housing due to a pressure difference between the interior of the ejection housing and ambient pressure while the aircraft is flying; and means for releasing the engagement of retaining member with the most rearward one of the decoys.

27. The apparatus according to claim 25, wherein the retention means comprises:

a plurality of retaining members, each of which engages one of the decoys to prevent ejection of the decoys from the ejection housing due to a pressure difference between the interior of the ejection housing and ambient pressure while the aircraft is flying; and indexing means for incrementally moving the retaining members and the decoys rearward in the housing when one of the decoys is to be deployed and for releasing the engagement of one of the retaining members with a most rearward one of the decoys.

28. The apparatus according to claim 25, further comprising:

a plurality of reels mounted to the housing, each of the lines being wrapped around one of the reels, wherein the retention means comprises at least one retaining member, which engages a most rearward one of the decoys to prevent ejection of the most rearward one of the decoys from the ejection housing due to a pressure difference between the interior of the ejection housing and ambient pressure while the aircraft is flying and which releases the most rearward one of the decoys when deployment of the decoy is desired.

29. The apparatus according to claim 25, further comprising:

a plurality of reels mounted to the ejection housing, each of the lines being wrapped around one off the reels, wherein the sensing means comprises a plurality of clamps, each of which receives one of the lines from one of the reels, each of the clamps being in a closed position when its line is deployed to provide support for one of the decoys deployed behind the aircraft and being movable to an open position to release the line if tension in the line indicates that the decoy is no longer on the end of the line.

30. The apparatus according to claim 25, further comprising:

a plurality of reels mounted to the ejection housing, each of the lines being wrapped around one of the reels, wherein the sensing means comprises a plurality of clamps, each of which receives one of the lines from one of the reels, each of the clamps being movable to a closed position when its line is deployed to provide support for one of the decoys deployed behind the aircraft and movable to an open position to release the line if tension in the line indicates that the decoy is no longer on the end of the line, and wherein the retention means comprises a plurality of retaining members, each of which engages one of the decoys to prevent ejection of the decoys from the ejection housing due to a pressure difference between the interior of the ejection housing and ambient pressure while the aircraft is flying; and indexing means for incrementally moving the retaining members and the decoys rearward in the housing when one of the decoys is to be deployed and for releasing the engagement of one off the retaining members with a most rearward one of the decoys.

31. A method for avoiding a heat-seeking missile strike in an aircraft which has a jet engine that produces an exhaust plume, comprising:

providing a decoy having a body with an exterior surface which has a reflective portion; and towing the decoy on a line behind the aircraft in a position for causing the reflective portion to reflect radiation emitted by the exhaust plume so as to attract heat-seeking missiles fired at the aircraft, the method further comprising:

sensing whether the decoy is hit by a missile, and if so, releasing the line and deploying another decoy on another line.

32. The method according to claim 31 further comprising:

reflecting from the decoy infrared radiation emitted by the exhaust plume both in a generally forward direction and in a generally rearward direction.

33. The method according to claim 31, further comprising:

reflecting infrared radiation emitted by the exhaust plume in a forward direction from the decoy by providing the body with a forward protruding nose having an infrared radiation reflective surface; and reflecting infrared radiation in a rearward direction from the decoy by providing the decoy with a tapering sidewall extending rearward from the nose which has an infrared radiation reflective surface and an annular member surrounding and spaced from the sidewall, the annular member having an internal infrared radiation reflective surface.

* * * * *